Aug. 21, 1956   J. BELSKY   2,759,262
CARTRIDGE ACTUATED SHEARS
Filed June 23, 1955   2 Sheets-Sheet 1

Jerome Belsky INVENTOR.

BY

Aug. 21, 1956  J. BELSKY  2,759,262
CARTRIDGE ACTUATED SHEARS
Filed June 23, 1955  2 Sheets-Sheet 2

Jerome Belsky
INVENTOR.

BY
Attorneys

United States Patent Office 2,759,262
Patented Aug. 21, 1956

2,759,262

CARTRIDGE ACTUATED SHEARS

Jerome Belsky, Falls Church, Va., assignor to Talco Engineering Company, Inc., Hamden, Conn., a corporation of Connecticut Application June 23, 1955, Serial No. 517,533

10 Claims. (Cl. 30—272)

The invention relates to a cartridge actuated device, and more particularly to novel shears adapted for use as a tree pruner and for other useful purposes.

The primary object of the present invention resides in the provision of a novel shears which can be automatically operated upon proper engagement of the shears with the material to be cut, while also utilizing the energy imparted by the propellant gases of a cartridge which has been fired to actuate the cutter or blade of the shears.

A further object of this invention resides in the provision of a cartridge actuated tree pruner which can be used to cut and sever limbs of trees of considerable dimensions, and which employs a trigger mounted so as to extend in a recess formed by the hook portion of the housing whereby the cartridge can be fired by a downward pull on the tree pruner.

Still further objects and features of this invention reside in the provision of a cartridge actuated shears that is strong and durable, simple in construction and manufacture, which employs a conventional automatic pistol mechanism for use in a firing train and for ejection of spent cartridges, which may be provided with an elongated pawl for use as a handle or which may have alternatively a hand grip thereon, and yet which is relatively inexpensive to manufacture, thereby permitting wide use and distribution.

These, together with the various ancillary objects and features of the invention which will become apparent as the following description proceeds, are attained by this cartridge actuated shears, a preferred embodiment of which has been illustrated in the accompanying drawings, by way of example only, wherein.

Figure 1:
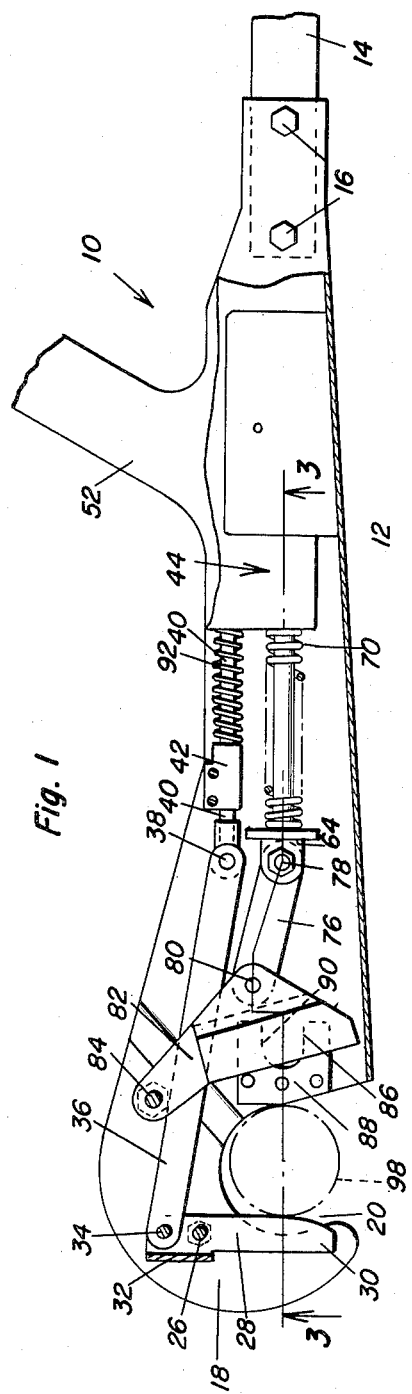
Figure 1 is a side elevation of the cartridge actuated shears with the portion of the housing thereof in which the major operating portions of the device are positioned being broken away and shown in section to show the other portions of the invention in detail.
Figure 2:
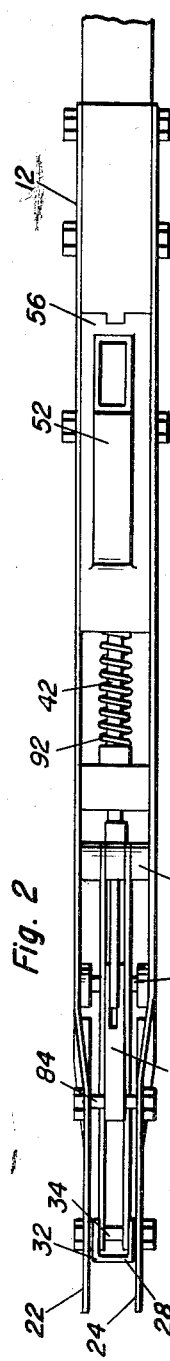
Figure 2 is a plan view of the invention.
Figure 3:
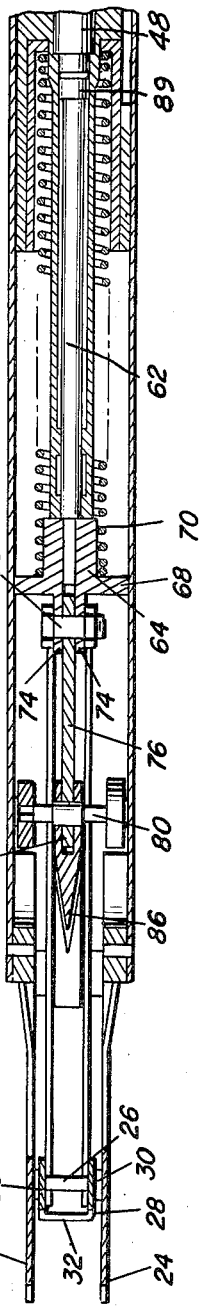
Figure 3 is an enlarged sectional detail view as taken along the planes of line 3—3 in Figure 1, and, Figure 4 is an enlarged sectional detail illustrating a firing mechanism utilized in this cartridge actuated shears.
Figure 4:
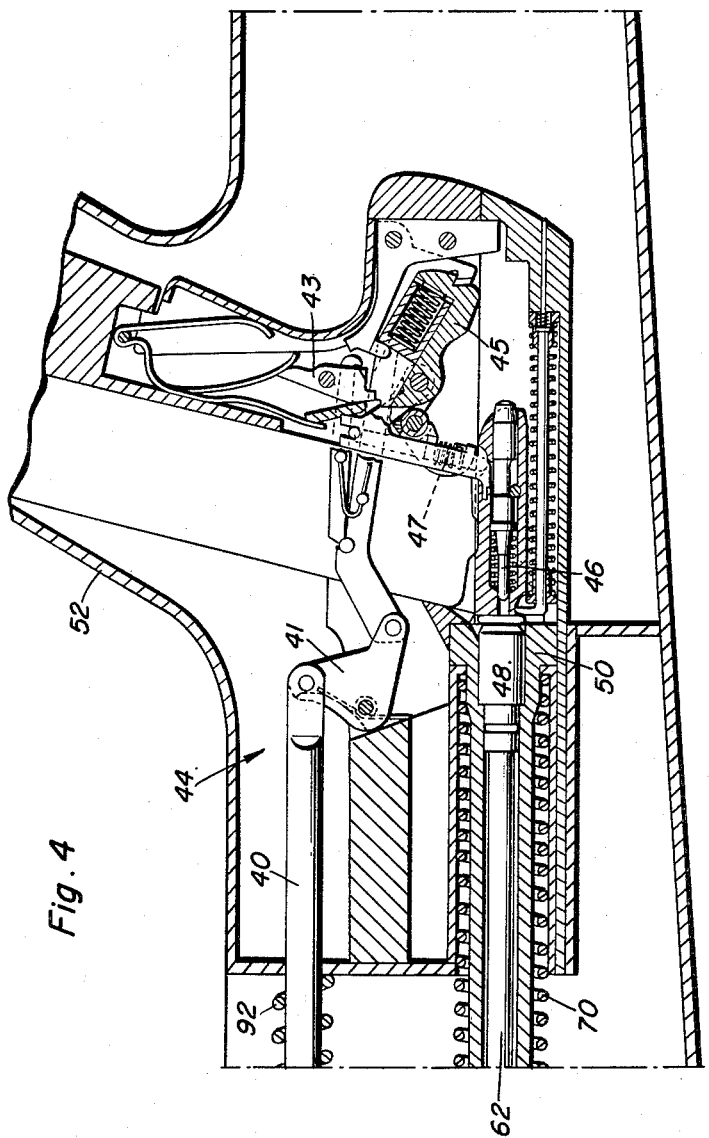

With continuing reference to the accompanying drawings wherein like reference numerals designate similar parts throughout the various views, reference numeral 10 is used to generally designate the cartridge actuated shears comprising the present invention. This cartridge actuated shears includes a housing 12 which is adapted to be mounted on an elongated pole 14, as by bolts 16, or to be secured to any other suitable handle, such as hand grips or the like.

The housing 12 has a hook portion 18 so arranged as to form a material receiving recess 20. The hook portion 18 is bifurcated as at 22 and 24.

Pivotally mounted in the hook portion 18 of the housing 12 on a pin 26 is a trigger 28 including lower bifurcated sections 30 depending from a upper portion 32 of substantially U-shape in configuration.

Pivotally connected to the trigger 28 as at 34 is a link 36 which is pivotally connected as at 38 to a rod 40 which slidably extends through a guide 42 fixed to the housing. The rod 40 is pivotally attached to a crank 41 of any conventional shape which is adapted to actuate the sear 43 of a conventional automatic pistol assembly shown generally at 44 so as to actuate the hammer 45 to drive a firing pin 46, through a spring-biased mechanism 47 for firing cartridges 48 received within the breech block 50 of the automatic pistol firing mechanism 44. A magazine 52 for providing the cartridges 48 is provided and the cartridges are fed into the breech block 50 in a conventional manner. The firing mechanism 44 is described in detail in U. S. Patent No. 2,535,156 to to Pastore et al., issued December 26, 1950. It is to be realized that other firing mechanisms may readily be employed without deviating from the spirit of the invention. Cartridge ejector 54 of conventional construction is likewise provided. The ejector 54 is, of course, adapted to function upon movement of the barrel 60. The breech block 50 is positioned within the breech 58 of a barrel 60 in which a piston 62 is slidably mounted. The propellant gases resulting from the firing of the cartridge 48 will cause the piston to move with respect to the barrel 60.

Mounted on the piston 62 is a piston end 64 having an annular collar 68 forming a seat for a spring 70. The spring 70 engages a shoulder 72 on the barrel 60. Pivotally connected between ears 74 on the piston end 64 is a link 76 held in position by a fastener 78. The link 76 is pivotally attached, as at 80, to a cutter 82 pivotally secured, as at 84, to the housing 12 and adapted to extend into the recess 20. The cutter 82 has a blade 86 forming a cutting edge.

Secured in the housing 12 is a stop 88 having a recess, as at 90, for receiving the cutter head to limit the outward movement of the cutter 82. The blade 86 is adapted to extend between the trigger arms 30 when in an extended position.

After the propellant gases have been exhausted, the spring 70 is adapted to return the cutter to its initial position, as is shown in Figure 1, while a spring 92 concentrically disposed on the rod 40 is designed to return the trigger to its initial position, likewise shown in Figure 1, from its actuated position.

The firing sequence of this automatic cartridge actuated shears is as follows: By pulling the hook portion 18 downwardly against a limb, as at 98, the limb 98 forces the trigger 28 into the bifurcated portions 22 and 24 of the hook 18 and causes the link 36 to actuate the rod 40 compressing spring 92 to cause the sear 43 of the automatic pistol firing mechanism 44 to release the hammer 45 to drive the firing pin 46 while said firing mechanism 44 actuates said firing pin 46. When the cartridge ignites, the piston 62 is forced forward, pressing the cutter 82 against the limb. The barrel meanwhile is held against the slide 56 by pressure against the forward face of the breech block 50. When the piston has completed the major part of its stroke, the piston head 89 engages the land 83 at the forward end of the barrel 60 to overcome the force on the breech block 50, thus dragging the barrel forward. The forward movement of the barrel 60 has the same effect as the backward movement of the slide in a standard automatic pistol mechanism. The remaining gases in the barrel are vented, and the spent cartridge is ejected by the ejectors 54 through slots which may be formed in the housing 12. At the end of the stroke, forward motion of the piston 62 is arrested by the stop 88 and the piston and cutter are returned to the original position by the return spring 70. The barrel is returned to its original position by recoil spring in the slide 56, not shown, and a new cartridge is forced into place by the conventional mechanism similar to an automatic pistol mechanism. The pruner is then ready to be fired again since the spring 92 returns the trigger 30 to its initial position.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A cartridge actuated shears comprising a housing having a hook portion at one end thereof, a trigger pivotally mounted in said hook portion, a firing pin, a firing mechanism for actuating said firing pin, link means connected to said trigger and said firing mechanism for actuating said firing mechanism to actuate said firing pin, a barrel in said housing, a breech for receiving a cartridge in communication with said barrel, a piston in said barrel, a cutter pivotally mounted in said housing, said piston being connected to said cutter.

2. A cartridge actuated shears comprising a housing having a hook portion at one end thereof defining a material receiving recess, a trigger pivotally mounted in said hook portion, a firing pin, a firing mechanism for actuating said firing pin, link means connected to said trigger and said firing mechanism for actuating said firing mechanism to actuate said firing pin, spring means associated with said link means for normally urging said trigger to extend into said recess, a barrel in said housing, a breech for receiving a cartridge in communication with said barrel, a piston in said barrel, a cutter pivotally mounted in said housing, said piston being connected to said cutter.

3. A cartridge actuated shears comprising a housing having a hook portion at one end thereof, a trigger pivotally mounted in said hook portion, a firing pin, a firing mechanism for actuating said firing pin, link means connected to said trigger and said firing mechanism for actuating said firing mechanism to actuate said firing pin, a piston in said housing, a firing train actuated by said firing pin for causing movement of said piston, a cutter pivotally mounted in said housing, said piston being connected to said cutter.

4. A cartridge actuated shears comprising a housing having a hook portion at one end thereof defining a material receiving recess, a trigger pivotally mounted in said hook portion, a firing pin, a firing mechanism for actuating said firing pin, link means connected to said trigger and said firing mechanism for actuating said firing mechanism to actuate said firing pin, spring means associated with said link means for normally urging said trigger to extend into said recess, a piston in said housing, a firing train actuated by said firing pin for causing movement of said piston, a cutter pivotally mounted in said housing, said piston being connected to said cutter.

5. A cartridge actuated shears comprising a housing having a hook portion at one end thereof defining a material receiving recess, a trigger pivotally mounted in said hook portion, a firing pin, a firing mechanism for actuating said firing pin, link means connected to said trigger and said firing mechanism for actuating said firing mechanism to actuate said firing pin, spring means associated with said link means for normally urging said trigger to extend into said recess, a barrel in said housing, a breech for receiving a cartridge in communication with said barrel, a piston in said barrel, a cutter pivotally mounted in said housing, said piston being connected to said cutter, said cutter normally being received in said housing, said piston when actuated urging said cutter into said recess, and spring means associated with said piston for returning said cutter into said housing.

6. A cartridge actuated shears comprising a housing having a hook portion at one end thereof defining a material receiving recess, a trigger pivotally mounted in said hook portion, a firing pin, a firing mechanism for actuating said firing pin, link means connected to said trigger and said firing mechanism for actuating said firing mechanism to actuate said firing pin, spring means associated with said link means for normally urging said trigger to extend into said recess, a piston in said housing, a firing train actuated by said firing pin for causing movement of said piston, a cutter pivotally mounted in said housing, said piston being connected to said cutter, said cutter normally being received in said housing, said piston when actuated urging said cutter into said recess, and spring means associated with said piston for returning said cutter into said housing.

7. A cartridge actuated shears comprising a housing having a hook portion at one end thereof, a trigger pivotally mounted in said hook portion, a firing pin, a firing mechanism for actuating said firing pin, link means connected to said trigger and said firing mechanism for actuating said firing mechanism to actuate said firing pin, a barrel in said housing, a breech for receiving a cartridge in communication with said barrel, a piston in said barrel, a cutter pivotally mounted in said housing, said piston being connected to said cutter, and an elongated pole forming a handle secured to said housing.

8. A cartridge actuated shears comprising a housing having a hook portion at one end thereof defining a material receiving recess, a trigger pivotally mounted in said hook portion, a firing pin, a firing mechanism for actuating said firing pin, link means connected to said trigger and said firing mechanism for actuating said firing mechanism to actuate said firing pin, spring means associated with said link means for normally urging said trigger to extend into said recess, a piston in said housing, a firing train actuated by said firing pin for causing movement of said piston, a cutter pivotally mounted in said housing, said piston being connected to said cutter, said cutter normally being received in said housing, said piston when actuated urging said cutter into said recess, and spring means associated with said piston for returning said cutter into said housing, and an elongated pole forming a handle secured to said housing.

9. A cartridge actuated shears comprising a housing having a hook portion at one end thereof, a trigger pivotally mounted in said hook portion, a firing pin, a firing mechanism for actuating said firing pin, link means connected to said trigger and said firing mechanism for actuating said firing mechanism to actuate said firing pin, a piston in said housing, a firing train actuated by said firing pin for causing movement of said piston, a cutter pivotally mounted in said housing, said piston being connected to said cutter, said hook portion being bifurcated, said cutter when actuated extending between the furcations of said hook.

10. A cartridge actuated shears comprising a housing having a hook portion at one end thereof defining a material receiving recess, a trigger pivotally mounted in said hook portion, a firing pin, a firing mechanism for actuating said firing pin, link means connected to said trigger and said firing mechanism for actuating said firing mechanism to actuate said firing pin, spring means associated with said link means for normally urging said trigger to extend into said recess, a piston in said housing, a firing train actuated by said firing pin for causing movement of said piston, a cutter pivotally mounted in said housing, said piston being connected to said cutter, said cutter normally being received in said housing, said piston when actuated urging said cutter into said recess, and spring means associated with said piston for returning said cutter into said housing, said hook portion being bifurcated, said cutter when actuated extending between the furcations of said hook.

No references cited.